United States Patent Office 3,488,532
Patented Jan. 6, 1970

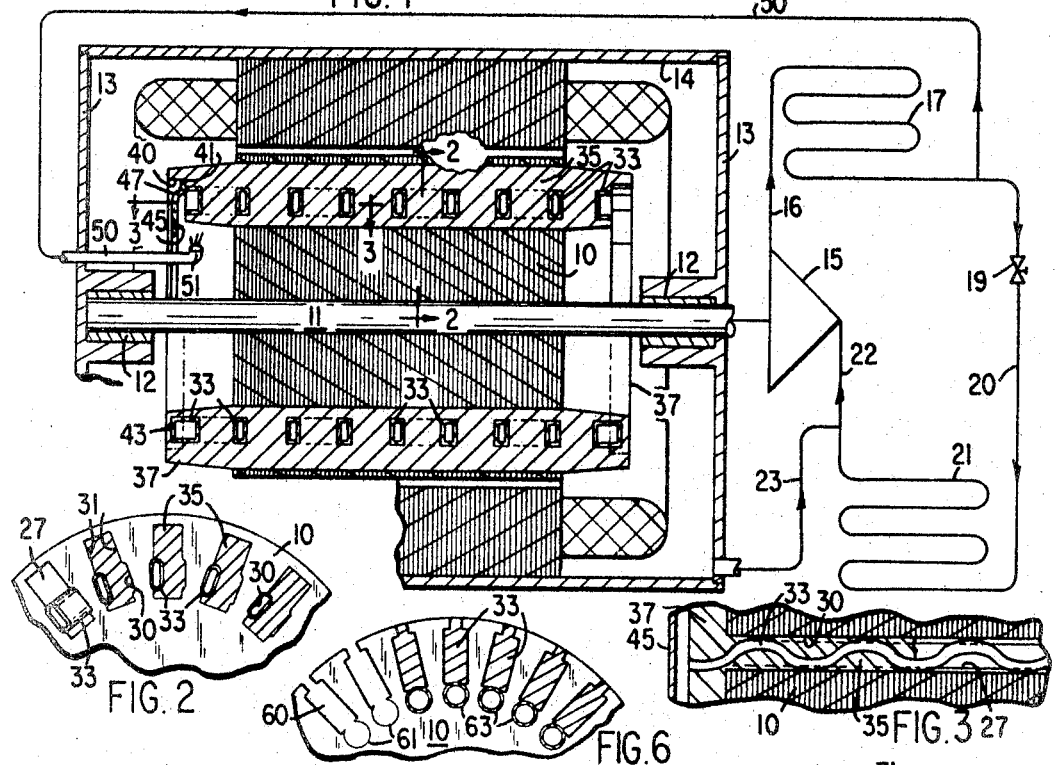
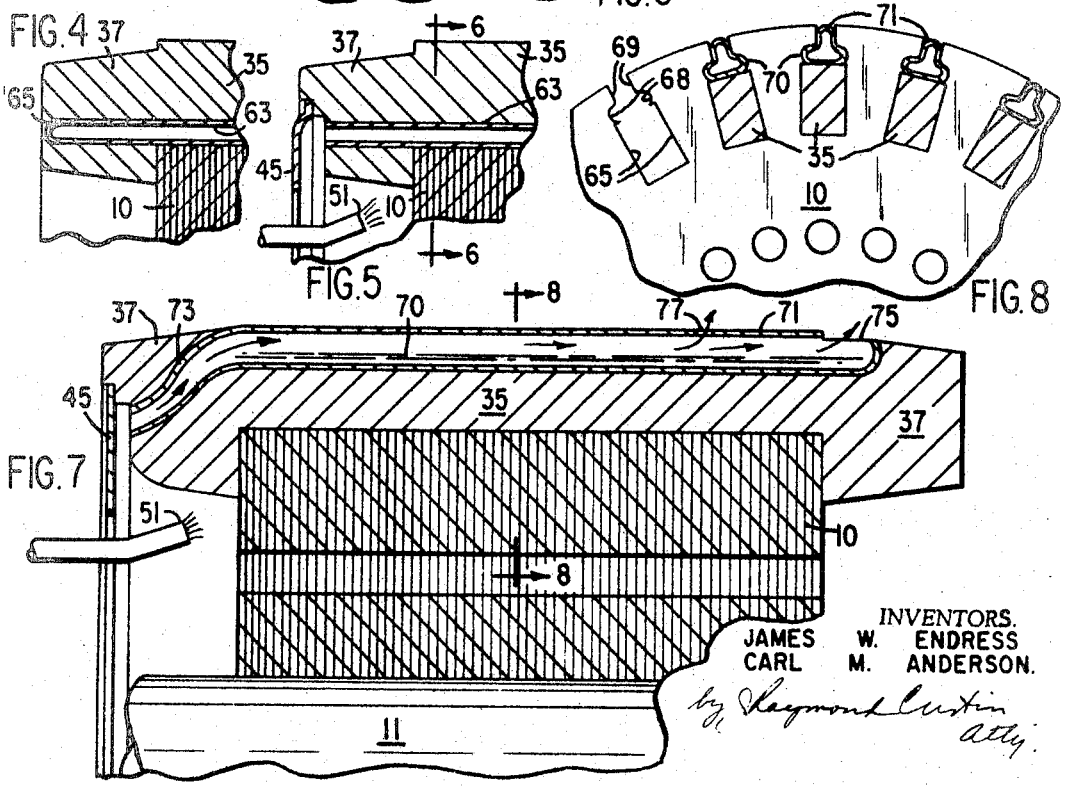

3,488,532
SQUIRREL CAGE MOTOR STRUCTURE AND METHOD OF FORMING SAME
James W. Endress, 715 Scarboro Drive, Syracuse, N.Y. 13209, and Carl M. Anderson, 115 Circle Road, Syracuse, N.Y. 13210
Filed Mar. 5, 1968, Ser. No. 710,540
Int. Cl. H02k 9/00, 3/06
U.S. Cl. 310—58     5 Claims

ABSTRACT OF THE DISCLOSURE

The squirrel cage rotor is formed with coolant conducting passages extending in a direction axially of the rotor and in direct heat exchange relation with the conducting bars of the squirrel cage. The passages open at their ends through the end rings of the cage structure. The arrangement includes means for directing coolant, preferably liquid refrigerant, to like ends of the passages for movement therethrough. The invention also embodies the method of forming the squirrel cage structure with the passages.

BACKGROUND OF THE INVENTION

Heat dissipation has always been a problem in electric motors. This problem becomes serious if the motor is totally enclosed and is operated with cooling mediums having temperature limitations. The problem becomes more serious in situations where space and weight are at a premium, requiring the motor to be of smaller physical dimension and therefore, containing less iron and copper for a given power output as, for example, in hermetically sealed refrigerating units.

Various arrangements have been devised to effect more efficient cooling of such motors, see Patents 3,146,605; 3,241,331 and 3,263,106. While such prior arrangements function to effectively bring about a substantial reduction in motor operating temperature, they did not approach the ultimate in motor stator and motor rotor cooling.

BRIEF SUMMARY OF THE INVENTION

Our invention has as an object a squirrel cage rotor construction embodying an arrangement which functions to effect the maximum of heat transfer from the motor. The important feature of this invention resides in that the rotor is formed with passages, preferably in the form of metallic tubular members, which are arranged in intimate contact with the conducting bars of squirrel cage structures.

The invention has as a further object a method of producing the rotor embodying our invention wherein the conducting bars and end rings of the squirrel cage structure are cast in an efficient manner without complicated die structure, or the consumption of any extra time in the casting operation. By our method, metallic tubular members are mounted in the conducting bar slots of the rotor, and retained therein against displacement during the casting of the conducting bars and end rings. The ends of the tubular members are closed and extend axially beyond the end of the rotor body. The squirrel cage end rings are cast about the end portions of the tubular member. Subsequently, the end rings are machined to remove the closed ends of the tubular members. The tubular members may be wholly, or partially, embedded in the cast conducting bars.

BRIEF DESCRIPTION OF THE DRAWINGS

FIGURE 1 is a sectional view of an electric motor for use in a refrigeration machine employing a squirrel cage rotor embodying our invention. In the lower portion of this figure, the end rings have not been machined;

FIGURE 2 is a fragmentary sectional view taken on line 2—2, FIGURE 1;

FIGURE 3 is a fragmentary sectional view taken on line 3—3, FIGURE 1;

FIGURE 4 is a fragmentary sectional view of a second embodiment of the invention taken at one end of the rotor illustrating a portion of one end ring and contiguous portion of a conducting bar, as the same are cast;

FIGURE 5 is a view, similar to FIGURE 4, showing the end ring machined;

FIGURE 6 is a view taken on line 6—6, FIGURE 5;

FIGURE 7 is a lengthwise sectional view of a third embodiment of the invention illustrating the formation of the coolant passages by tubular members embedded at the outer or peripheral surface of the conducting bars; and FIGURE 8 is a view taken on line 8—8, FIGURE 7.

DESCRIPTION OF THE PREFERRED EMBODIMENT

Referring to FIGURES 1 and 8, 10 designates the rotor body of conventional laminated structure fixedly mounted on a shaft 11 journalled at its ends in bearings 12 mounted in the end shells 13 of a casing, or frame 14. The shaft 11 is illustrated as being operatively connected to a refrigerating compressor 15, the discharge line 16 of which extends to a condenser 17. The output of the condenser is connected by line 20 to an evaporator 21 having a return line 22 extending to the compressor. The motor and the compressor 15 are often mounted in a hermetically sealed casing. Serially connected in line 20 is conventional expansion means 19.

Referring to FIGURES 1, 2 and 3, the rotor body 10 is formed of a plurality of plates each of which is provided with a plurality of slots, or passageways, 27. As shown in FIGURE 2, these passageways are rectangular shape, and are formed with recesses 30 in their opposite side walls 31. These recesses are located intermediate the side walls of the passageways. An undulated metallic tubular member 33 is positioned in each of the passageways 27, and is dimensioned and formed to engage the recesses 30, as illustrated at the left in FIGURE 2. The undulated formation of the tubes, in conjunction with the recesses 30 in the side walls of the passages, provides an interlock between the tubes 33 and the rotor body, maintaining the tubular members in proper position during the injection of the metal into the passageways when the conducting bars 35 and end rings 37 are cast.

The ends of the members 33 are closed and the end portions of the tubes extend axially beyond the ends of the rotor 10, but terminate in spaced relation to the ends of the die in which the rotor is placed preparatory to the die or mold casting operation.

When the metal is injected into the die, the conducting bars 35 are formed integral with the end rings 37, the tubular members 33 being completely embedded in the conducting bars, and the end portions of the tubes are embedded in the end rings 37.

Subsequent to the die casting operation, the end rings are machined to form a circular flange 40 and a shoulder 41. That is, the outer faces of the end rings are counterbored and in this operation, the closed ends 43 of the tubular members 33 are cut away, whereupon the ends of the tubes are opened. An annular baffle 45 is mounted within the flange 40 and seated against the shoulder 41 and may be retained in position by staking the flange 40. The main annular portion of the baffle 45 merges with an inwardly curved portion 47, which joins a radial flange seated against the shoulder 41. With this arrangement, the baffle 45 is spaced outwardly axially from the now open ends of the tubular members 33. A conduit 50 is provided with a nozzle 51 arranged to direct coolant radially against the inner surface of the end ring and by centrifugal action, the coolant is moved between the end ring and the baffle 45 and directed through the tubular members 33. Conduit 50 is connected to liquid line 20 to supply liquid refrigerant to the motor. Line 23 connects the motor housing with the suction line 22 for returning refrigerant to the compressor from the motor housing. The end ring at the opposite end of the rotor is machined in like manner, but need not be provided with a baffle.

In the arrangement shown in FIGURES 4, 5 and 6, the rotor body 10 is formed with conductor bar receiving slots 60, two slots being shown at the left, FIGURE 6. These also are shown as of rectangular formation, the inner portion being of enlarged circular configuration shown at 61. Straight tubular members 63 are inserted in the circular bottom portion of the slots, the ends of the tubular member being closed, as shown at 65, FIGURE 4, and the end portion of the tubes extending axially outwardly from the ends of the rotor body 10. The conducing bars 35 are cast in the manner previously described, the end ring portions 37 encasing the end portions of the tubes. Thereafter, the end rings are machined to receive the baffles 45. With this arrangement, the conducing bars 35 are cast in intimate contact with the tubular members 63.

In FIGURES 7 and 8, the tubular members are positioned in contact with the outer portion of the conducting bars 35. In this arrangement, the rotor body 10 is formed with conductor bar receiving slots, the inner side walls 65 of which join with curved portions 68, FIGURE 8, and the curved portions, in turn, merge with outer walls 69. The spacing between the outer walls 69 is less than the spacing between the inner walls 65. Tubular members 70 are, in cross section, of general T-shape form, or have ridges 71 positioned between the outer walls 69 of the slots. Here again, this arrangement serves to maintain the tubular members correctly positioned during the casting operation. It will be observed in each of these arrangements, the die does not have to be provided with means for orienting the tubular members.

While we have described a preferred embodiment of the invention, it is to be understood the invention is not limited thereto since it may be otherwise embodied within the scope of the following claims.

We claim:

1. A cooling system for motors having a squirrel cage rotor, a rotor body formed with axially extending conducting bar receiving slots, conducting bars cast in said slots and end rings cast integral with said bars, the passages being formed by tubular members and said passages arranged in heat conducting contact to said bars and extending axially of the rotor body, said passages opening at their ends through said end rings, an annular coolant baffle attached to one end ring and being positioned axially outwardly from like ends of said passages, coolant conveying means having an outlet positioned for discharging a flow of coolant outwardly between said baffle and the open ends of said passages, said baffle serving to direct the coolant axially through said passages.

2. A cooling system as set forth in claim 1, wherein said passages are formed by tubular members positioned in the bottom of said slots.

3. A cooling system as defined in claim 1, wherein said passages are formed by tubular members positioned in said slots at the peripheral area of the rotor body.

4. A coolant system as set forth in claim 1, wherein said passages are formed by tubular members embedded in the medial radial portion of said bars.

5. The method of forming a squirrel cage rotor structure having coolant passages consisting in positioning tubular members closed at their ends in the bar receiving rotor slots, said members extending axially outwardly from the ends of the rotor body, casting conducting bars and end rings about said tubular members and subsequently removing a portion of said end rings and the closed end portions of said tubular members by machining the end rings.

References Cited

UNITED STATES PATENTS

| 2,249,882 | 7/1941 | Buchanan | 310—58 |
| 2,390,130 | 12/1945 | Sigmund | 310—54 |
| 2,653,255 | 9/1953 | Baudry | 310—64 |

FOREIGN PATENTS 1,044,574 10/1966 Great Britain.

OTHER REFERENCES

German pre-publication 1,052,544 of Mar. 12, 1959; Siemens-Schuckertwerke; 310/61.

MILTON O. HIRSHFIELD, Primary Examiner

R. SKUDY, Assistant Examiner

U.S. Cl. X.R.

310—211